United States Patent [19]

Satomi et al.

[11] Patent Number: 5,193,086
[45] Date of Patent: Mar. 9, 1993

[54] NETWORK SYSTEM HAVING A LINE SWITCHING FUNCTION

[75] Inventors: Shigeki Satomi, Tokyo; Naoki Ono, Yokohama, both of Japan

[73] Assignee: Hitachi, Ltd., Tokyo, Japan

[21] Appl. No.: 779,797

[22] Filed: Oct. 21, 1991

Related U.S. Application Data

[63] Continuation of Ser. No. 398,171, Aug. 23, 1989, abandoned.

[30] Foreign Application Priority Data

Aug. 26, 1988 [JP] Japan .................................. 63-210726

[51] Int. Cl.$^5$ .............................................. H04J 03/14
[52] U.S. Cl. .................................. 370/16; 340/825.01; 371/8.1
[58] Field of Search .................. 370/16, 53, 54, 110.1, 370/13, 58.1, 80, 63; 740/825.01, 827; 371/11.1, 11.2, 8.1, 10.2, 13, 7

[56] References Cited

U.S. PATENT DOCUMENTS

| | | | |
|---|---|---|---|
| 2,680,162 | 4/1990 | Brehm et al. | 370/16 |
| 4,119,815 | 10/1978 | Frankfort et al. | 340/825.01 |
| 4,466,095 | 4/1990 | Kawano et al. | 370/63 |
| 4,680,776 | 4/1990 | Ikeuchi et al. | 370/63 |
| 4,831,617 | 5/1989 | Iwasaki | 370/16 |
| 4,847,837 | 7/1989 | Marales et al. | 370/16 |
| 4,853,927 | 8/1989 | Wenzel | 370/16 |
| 4,899,337 | 2/1990 | Hisai | 370/80 |
| 4,920,529 | 4/1990 | Sasaki et al. | 370/16 |
| 4,967,406 | 10/1990 | Yagi et al. | 370/16 |

FOREIGN PATENT DOCUMENTS

| | | | |
|---|---|---|---|
| 58-44839 | 3/1983 | Japan | 370/16 |
| 53-193653 | 8/1988 | Japan | 370/16 |

*Primary Examiner*—Douglas W. Olms
*Assistant Examiner*—Dang Ton
*Attorney, Agent, or Firm*—Kenyon & Kenyon

[57] ABSTRACT

A network system includes a plurality of nodes connected to each other via line switching units through communication lines and backup lines and a network control unit connected to the line switching units. At an occurrence of a communication line failure, the network control unit supplies the line switching units with a line switching instruction to change over from the failed line to backup lines.

8 Claims, 15 Drawing Sheets

FIG. 3A

| CURRENT LINE (CODE NAME) | BACKUP LINE (CODE NAME) | SWITCHING UNIT CALL INITIATION No. | SWITCHING UNIT CALL TERMINATION No. | NETWORK CONTROL CENTER CALL INITIATION No. | PASSWORD |
|---|---|---|---|---|---|
| L001001 | L100001 | 06-315-8758 | 03-444-1234 | 03-768-1151 | 6018 |

FIG. 3B

| CURRENT LINE (CODE NAME) | BACKUP LINE (CODE NAME) | SWITCHING UNIT CALL INITIATION No. | SWITCHING UNIT CALL TERMINATION No. | NETWORK CONTROL CENTER CALL INITIATION No. | PASSWORD |
|---|---|---|---|---|---|
| L001001 | L100001 | 03-444-1234 | 06-315-8758 | 03-768-1151 | 6018 |

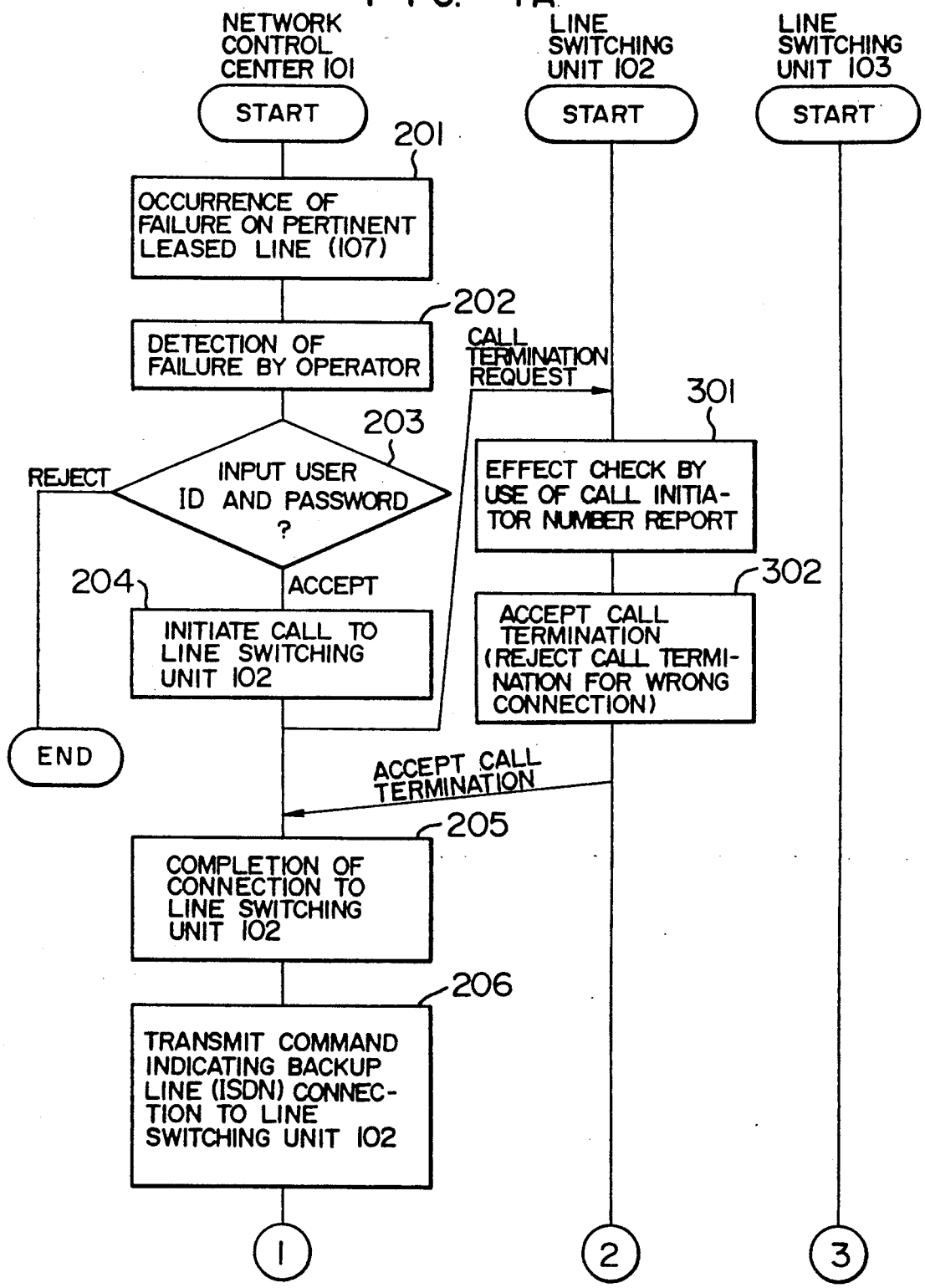

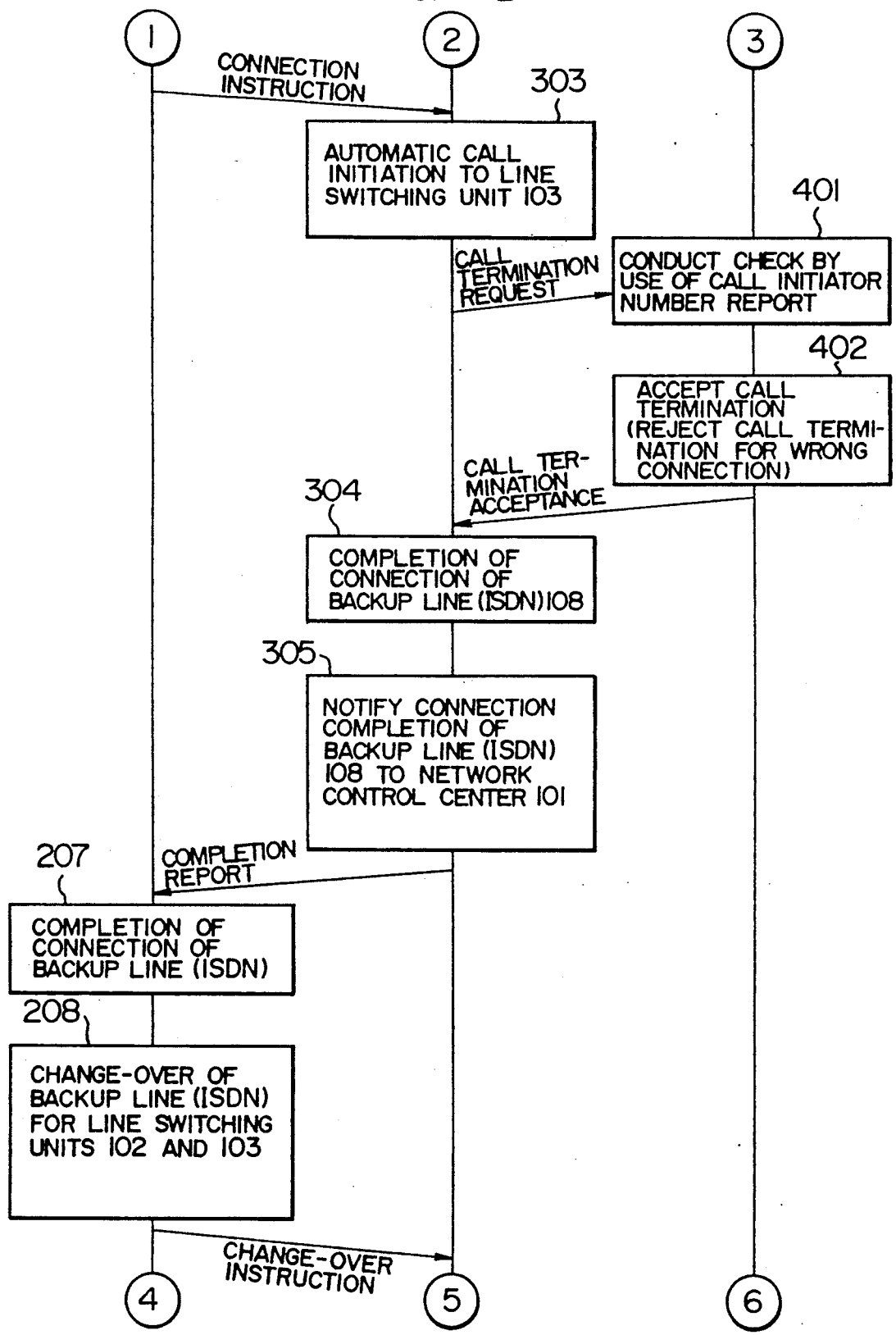

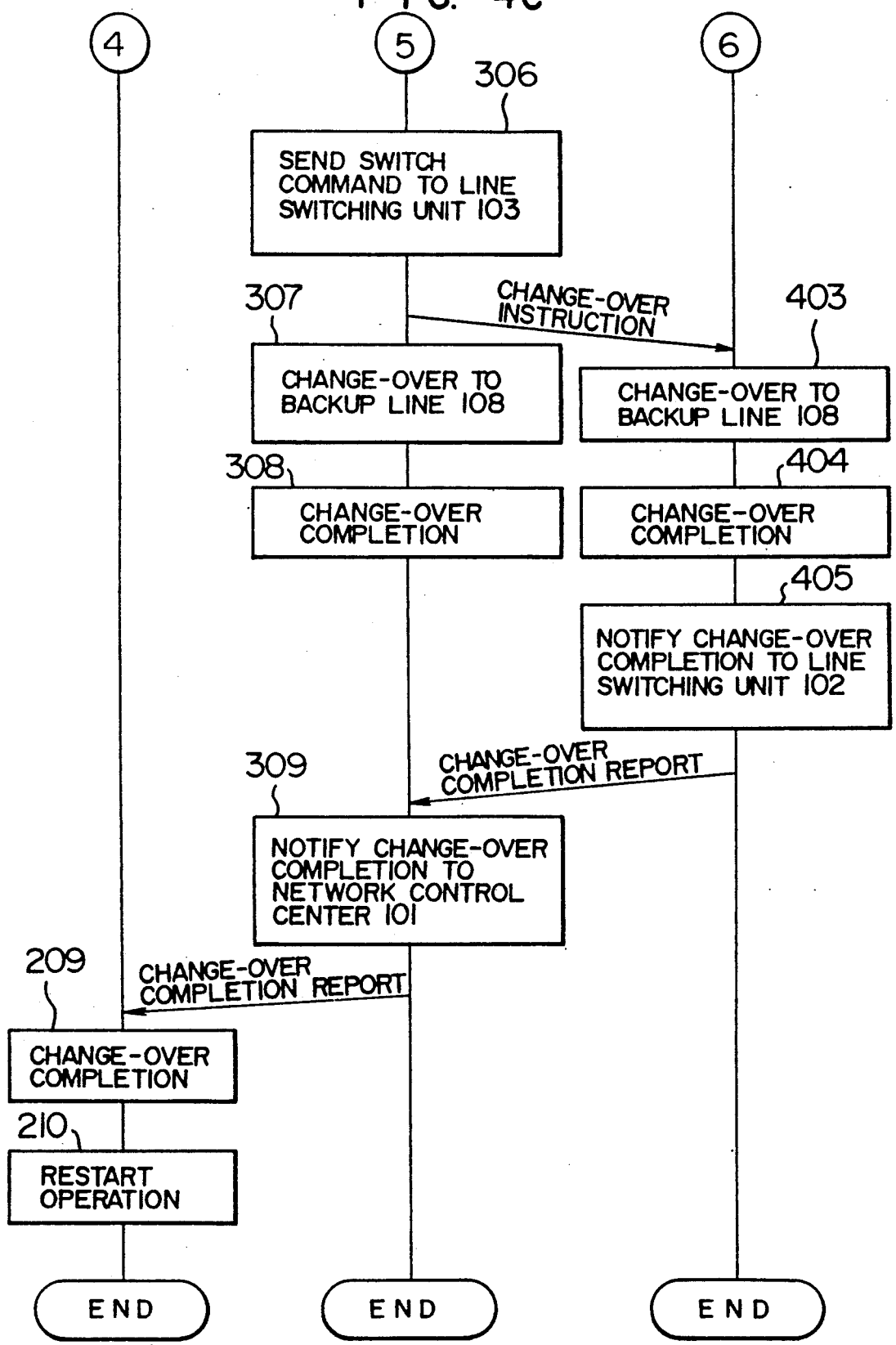

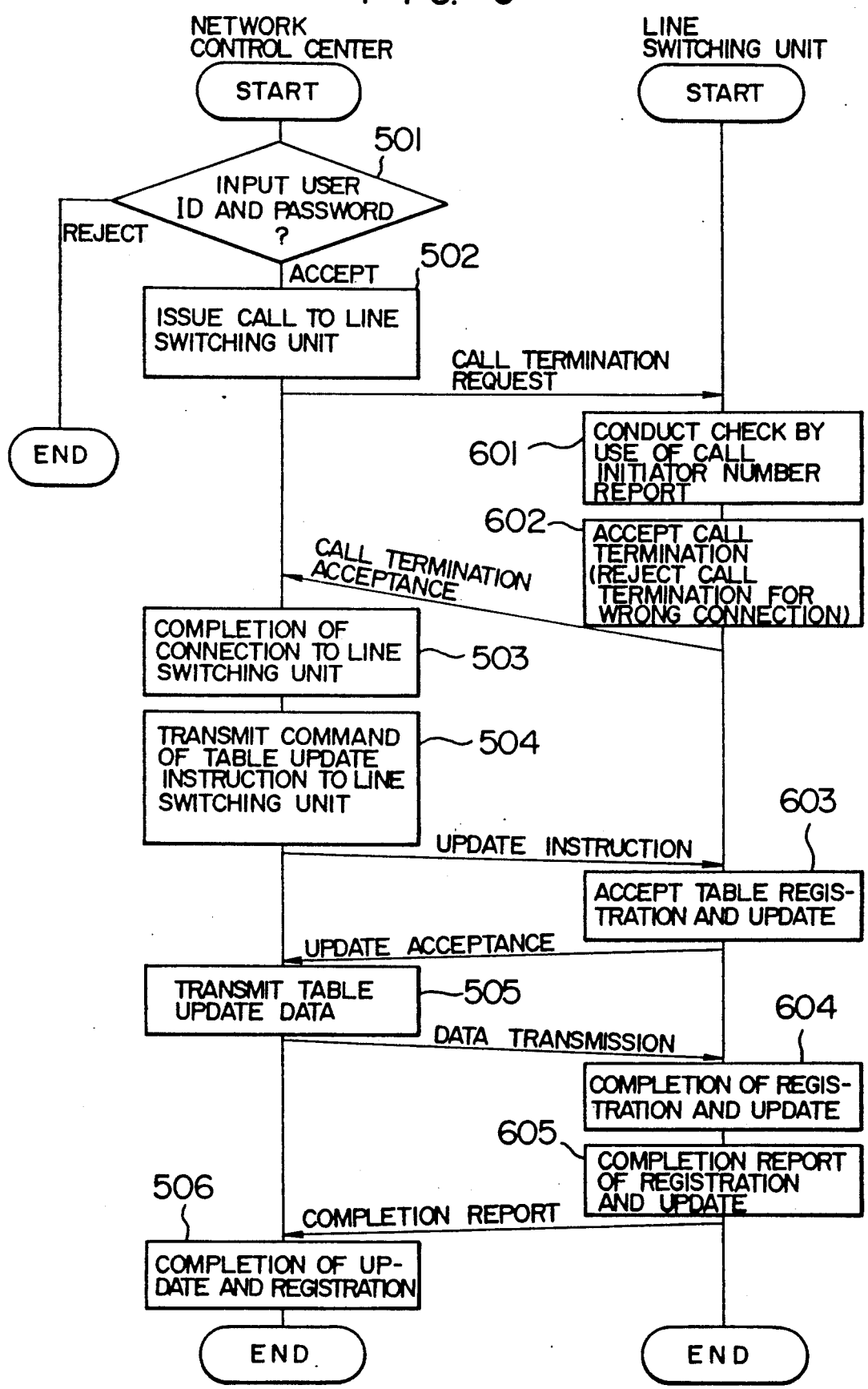

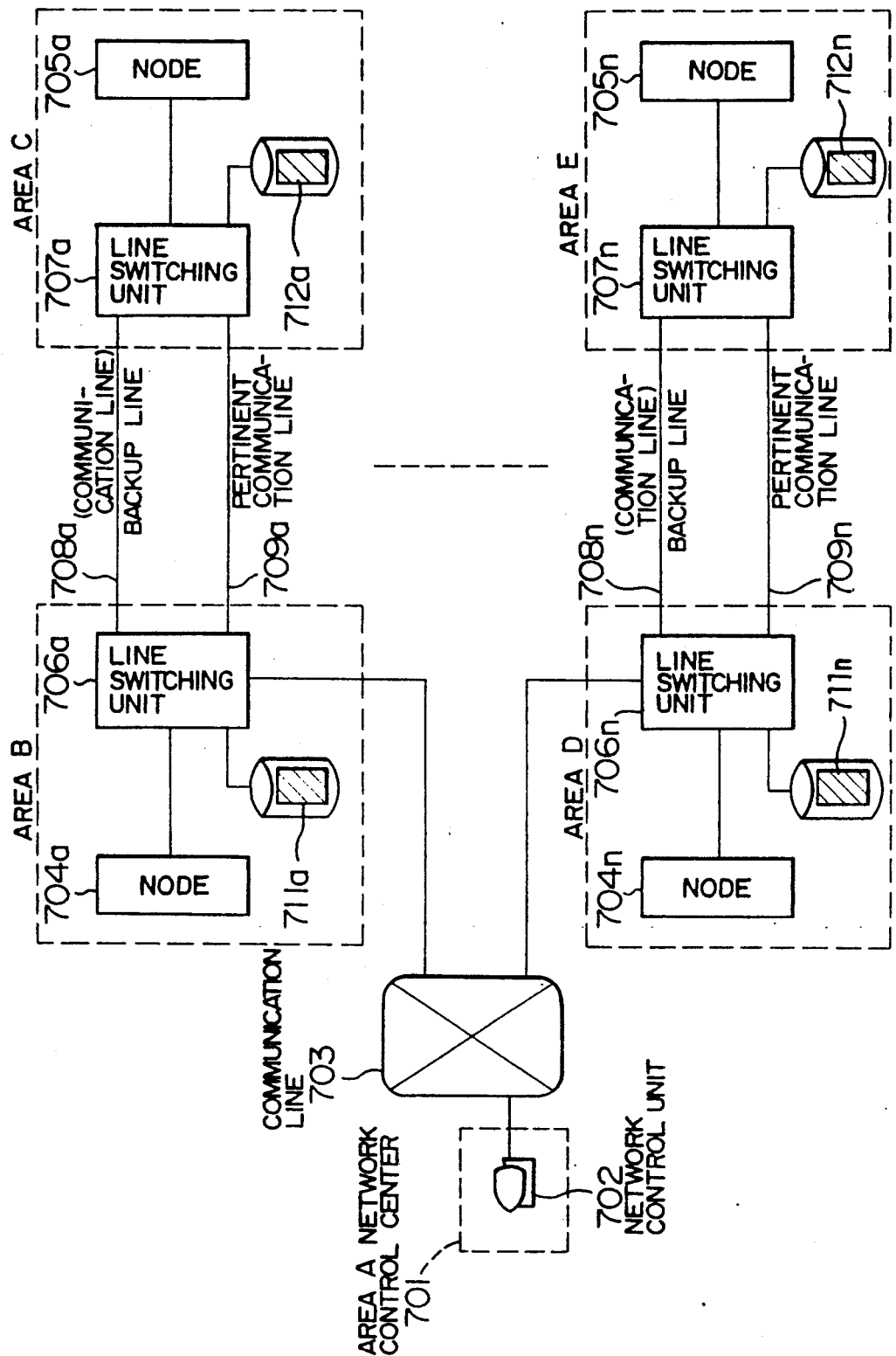

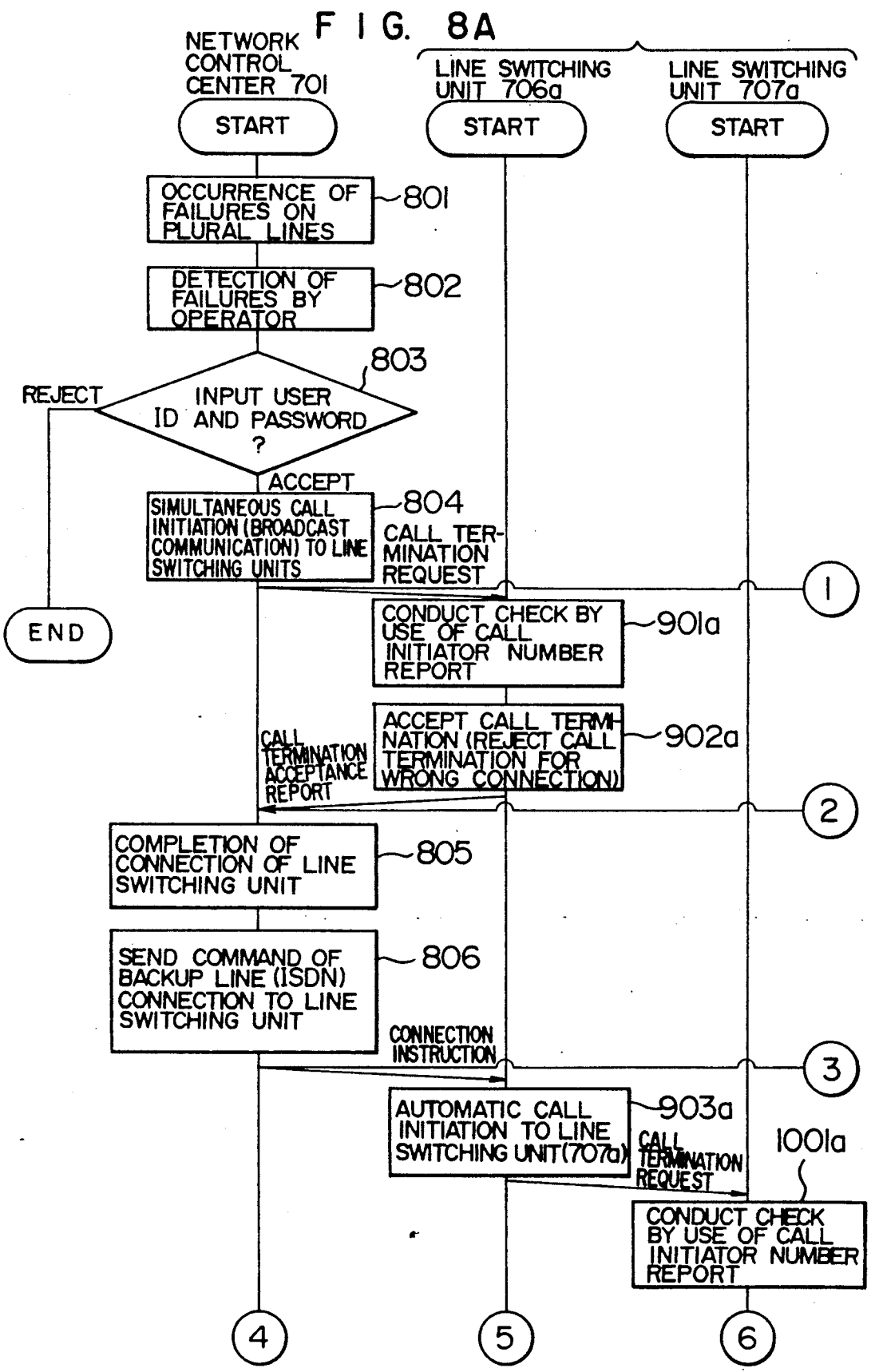

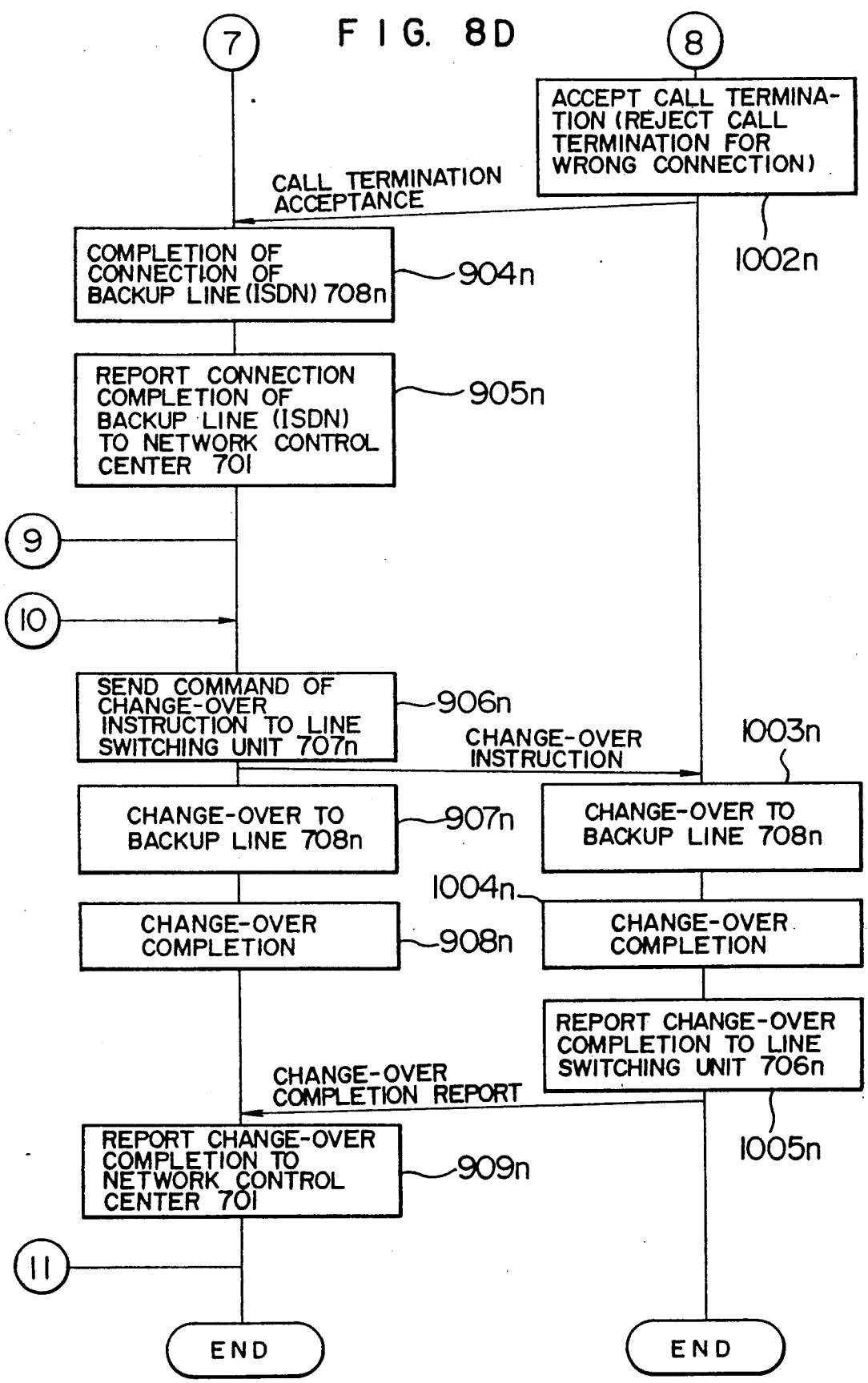

FIG. 9

| No. | FAILED LINE (CODE NAME) | BACKUP LINE (CODE NAME) | END ~ END | LINE SWITCHING UNIT CALL TERMINATION No. | LINE SWITCHING UNIT CALL TERMINATION (Y/N) | BACKUP LINE CONNECTION (Y/N) | BACKUP LINE CHANGE-OVER (Y/N) | PASSWORD |
|---|---|---|---|---|---|---|---|---|
| 1 | L.001001 | L.100001 | TOKYO ~ OSAKA | 03-444-1234 | Y | Y | Y | XXXX |
| 2 | L.001002 | L.100002 | NAGOYA ~ OSAKA | 06-765-3421 | Y | Y | Y | XXXX |

NETWORK SYSTEM HAVING A LINE SWITCHING FUNCTION

This application is a continuation of application Ser. No. 07/398,171, filed on Aug. 23, 1989, now abandoned.

BACKGROUND OF THE INVENTION

The present invention relates to a network system having a line switching function, and in particular, to a network system in which at a failure of a communication line, the failed line can be changed over to a backup line through a remote centralized control conducted by a network control center.

With advances of networking, a system has been generally employed in which computers installed at remote locations are linked with communication lines to execute information processing. In this situation, reliability of the network system becomes quite important, and as a measure to obtain higher reliability, constituent components of the system are configured in a duplicated fashion. For a line failure, the line is replaced with a backup line. JP-A Nos. 58-44839 and 63-193653 disclose a change-over of a failed line to a backup line at an occurrence of a communication line failure. In general, the change-over of the failed line to the backup line is conducted by use of switches of line switching units installed at respective points of the network. According to the prior art technology above, the change-over operation is achieved in at least one of the duplicated line switching units. Consequently, in a network system comprising many line switching units, many maintenance engineers are required to stay as resident operators at the respective locations of the line switching units.

SUMMARY OF THE INVENTION

The present invention provides a network system capable of achieving the line switching operation through a remote centralized control.

The present invention also provides a network including a security function for an authorization of a connection associated with the line switching control.

The present invention still further provides a network system utilizing an integrated service digital network (ISDN) which is capable of reliable and cost-reduction line switching.

According to the present invention, a network system includes a plurality of nodes connected to each other via line switching units through communication lines and backup lines and also includes a network control center linked to the line switch units (and monitoring the states of communication lines); When a failure of a communication line occurs, the network control center issues a switch instruction to the line switching unit connected to the failed communication line, thereby conducting a change-over from the failed communication line to the backup line.

Furthermore, each of the line switching units holds the numbers of the network control centers authorized to issue the line switch instruction thereto such that at a call initiation of the line switching unit, the numbers are checked for the authorization of the call.

According to the present invention, the line switch instruction is possibly issued to the respective line switching units in a centralized fashion so as to accomplish a centralized control of the change-over to the backup line from a remote location.

In addition, when leased lines or public lines are employed as the communication lines (for the backup lines and for the lines between the network control center and the line switching units), a security function is effected to allow a connection between the proper or authorized network control center and each line switching unit, which prevents a wrong connection from being established. With the above provision, the change-over to the backup line is implemented from a remote location in a centralized manner, thereby simplifying the change-over operation.

DESCRIPTION OF THE DRAWINGS BRIEF

These and other objects and advantages of the present invention will become apparent by reference to the following description and accompanying drawings wherein:

FIGS. 3A and 3B are diagrams showing examples of a table in the line switching unit;

FIGS. 4A to 4C and FIG. 5 are flowcharts showing line change-over processing of FIG. 1;

FIG. 6 is a flowchart showing operations to register data to and to update data in the table in the system of FIG. 1;

FIG. 7 is a block diagram schematically showing an alternative embodiment of the network system according to the present invention;

FIGS. 8A to 8D are flowcharts showing line change-over processing of FIG. 7;

FIG. 9 is a diagram showing an operation screen of the network control unit.

DETAILED DESCRIPTION

Figure 1:
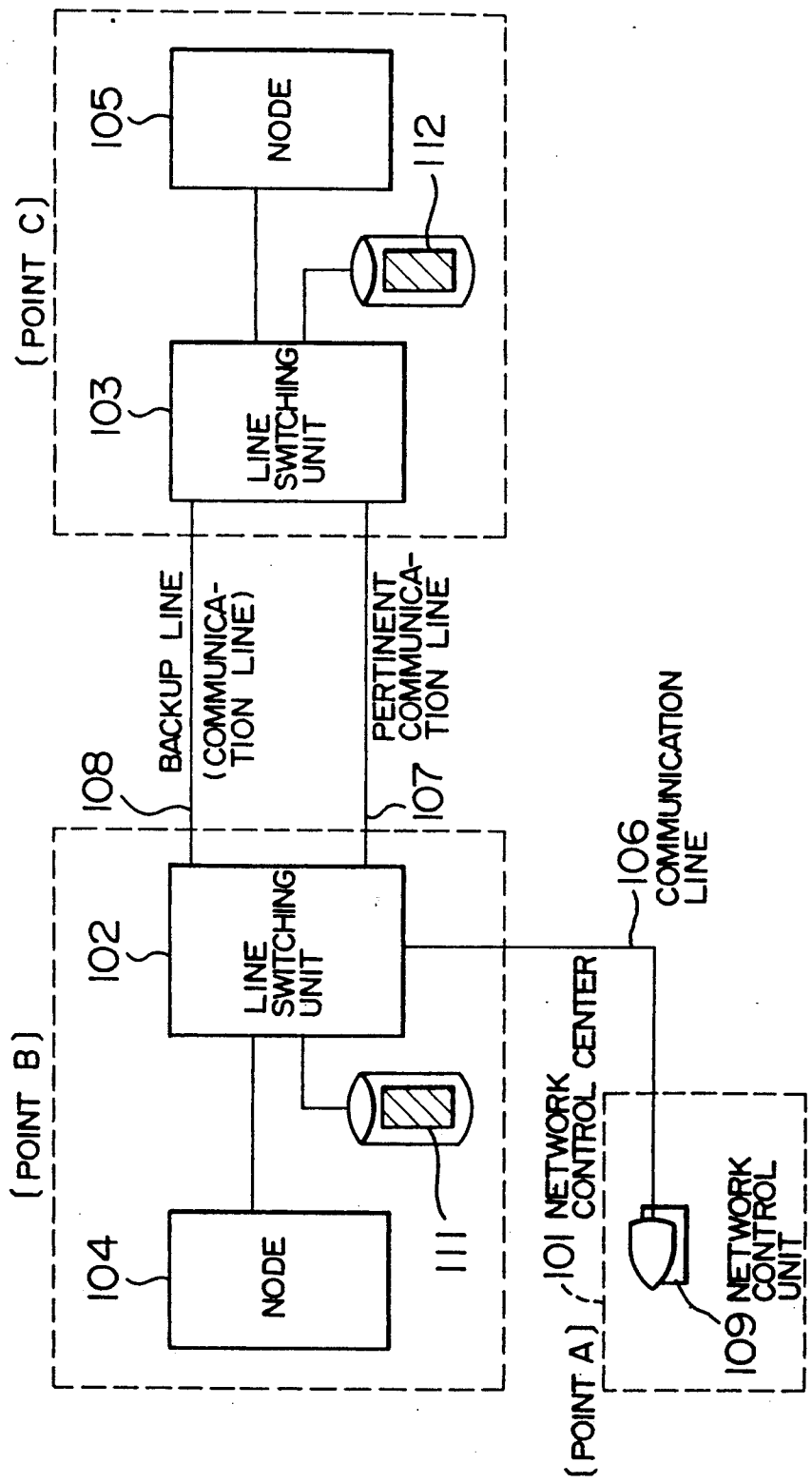
FIG. 1 is a schematic block diagram showing a first embodiment of the network system according to the present invention.

Referring now to the drawings, description will be given of embodiments according to the present invention.

FIG. 1 is a block diagram of a network as an embodiment according to the present invention. This system includes a network control center 101 at point A where a network control unit 109 is installed. The network control unit 109 is implemented by a personal computer, a workstation, or the like. The system further includes line switching units 102 and 103 and nodes 104 and 105 at points B and C, respectively. These nodes 104 and 105 are connected respectively via the line switching units 102 and 103 through a communication line 107 and a backup line 108. Each of the nodes 104 and 105 is a device constituting the network such as a host computer, a distributed processor, a computer of a terminal device or the like, a packet switching equipment, a line switching device, a line multiplexer, or a power supply unit. The line switching unit may be integrated in a node in some cases. The network control unit 109 at the point A is connected to the line switching unit 102 at the point B through a communication line 106. For each of the communication line and the backup line, an ISDN, a subscriber telephone network, a DDX-C, a leased line, or the like may be used. In this embodiment, a description will be given of the case where the ISDN is employed as the communication line 106 between the network control center 101 and the line switching unit 102 and the backup line 108.

Figure 2:
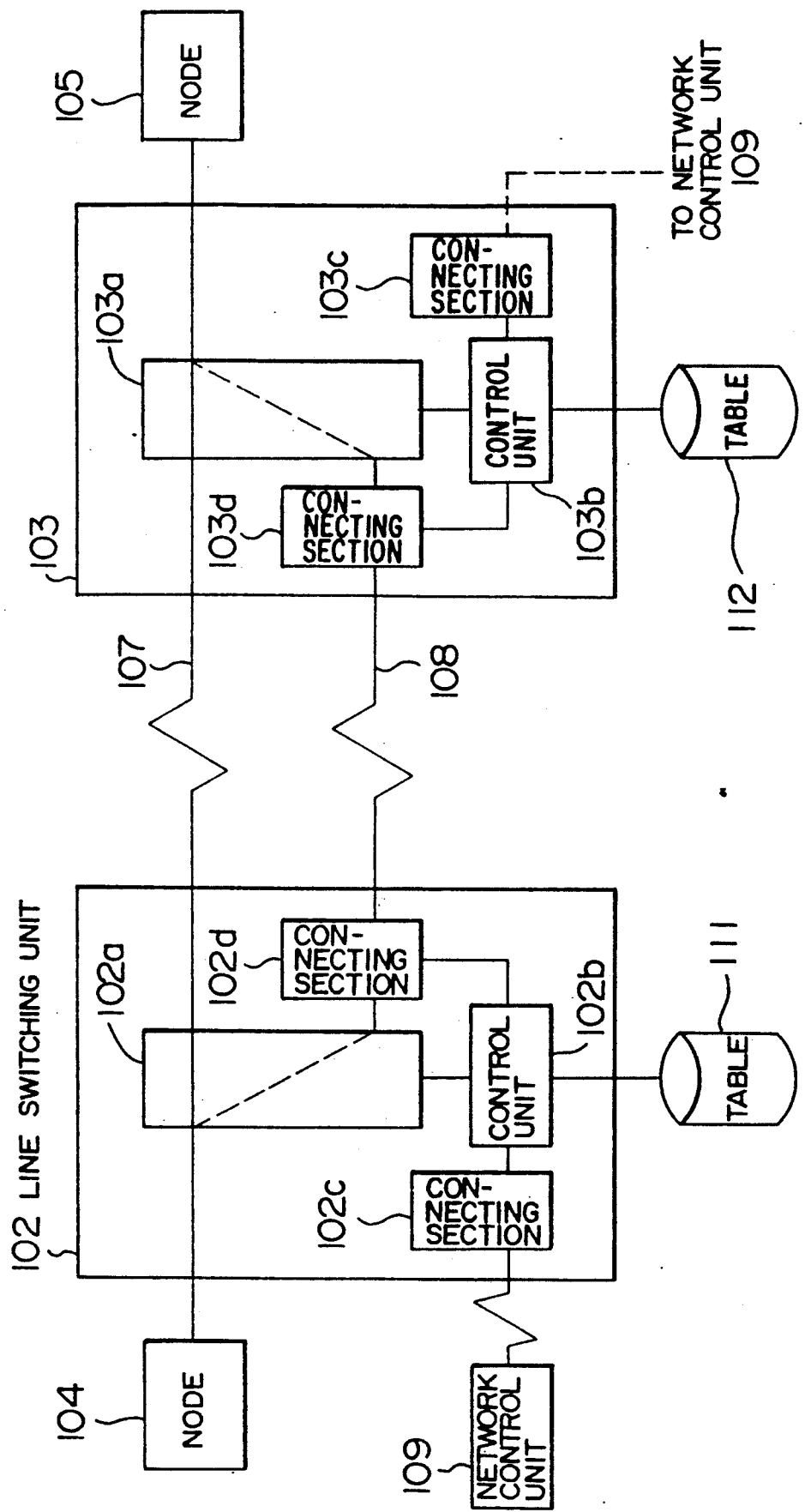
FIG. 2 is a block diagram showing a specific example of the line switching unit of FIG. 1.

FIG. 2 shows in detail the line switching units 102 and 103. The line switching unit 102 includes a line switching mechanism 102a, a control unit 102b, a network control center connecting section 102c, and a connecting section 102d establishing a connection between line switching units. The line switching unit 103 is constituted in a similar fashion. The connecting or interface section 102d functions to receive a call termination associated with a call initiated from the network control unit 109. The line switching unit 102 is connected to a table 111 and controls the line switching mechanism 102a. Under control of the control section 102b, the line switching mechanism 102a conducts a change-over operation to connect the node 104 having been linked to the current line 107 to the backup line 108. The connecting section 102d initiates a call to the partner line switching unit 103 under control of the control section 102b. The network control unit 109 may be connected to the line switching unit 103 in the similar fashion to that of the line switching unit 102.

FIGS. 3A and 3B respectively show examples of the tables 111 and 112 of the line switching units 102, 103. The table 111 of FIG. 3A holds code names respectively of a current line and a backup line of the line switching unit 102, a switching unit call initiation number (the number of the line switching unit 103 to which the line switching unit 102 is connected), a switching unit call termination number (the number of the line switching unit 102,) a network control center call initiation number represented by the number of the network control center, and a password. The table 112 of FIG. 3B keeps the similar contents. The contents of these tables 111 and 112 are stored therein through a download operation from the network control center 101 prior to the operation of the system.

Referring next to FIGS. 4A to 4C and FIG. 5, a description will be given of the switching control operation. The processing steps of FIGS. 4A to 4C are to be connected with each other as indicated by numerals in the circles. In respect to the processing, the size and configuration of the network system are arbitrarily selected.

In FIGS. 4A to 4C, when a failure is detected on the current communication line 107 and the maintenance engineer (the network control operator, the computer operator, or the like) finds the occurrence of the failure (steps 201 and 202), a request for an input of a user identification (ID) and password is issued to identify the worker or operator conducting the line switch operation (step 201). If the switching operation is allowed, the operator achieves the switching of the line (step 204); otherwise, the operation request is rejected. In order to establish a connection between the network control center 101 and the line switching unit 102, the network control center 101 issues a call to the line switching unit 102 (step 204). In this embodiment, the call is issued to the line switching unit 102; however, the call initiation may possibly be achieved to either one of the line switching units 102 and 103.

Figure 5:
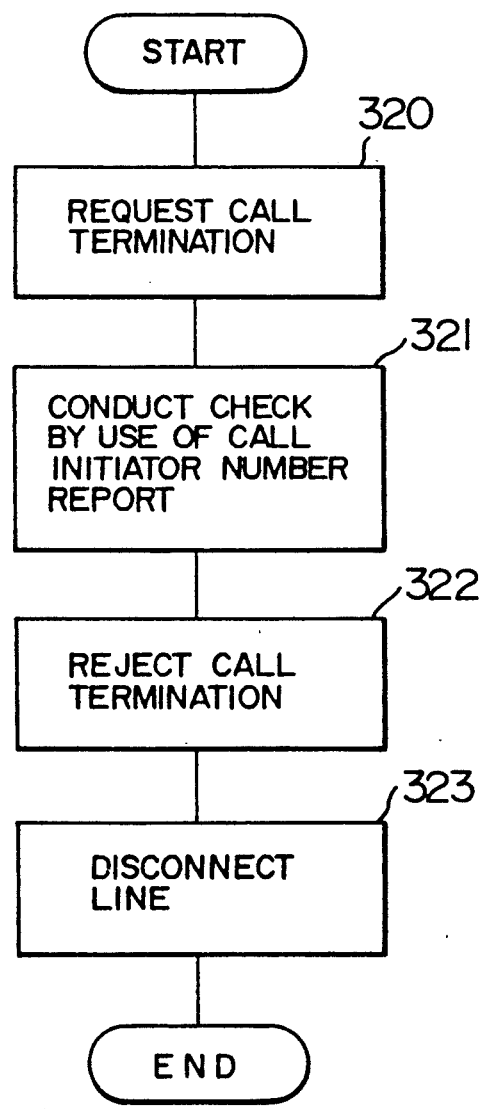
Figure 8B:
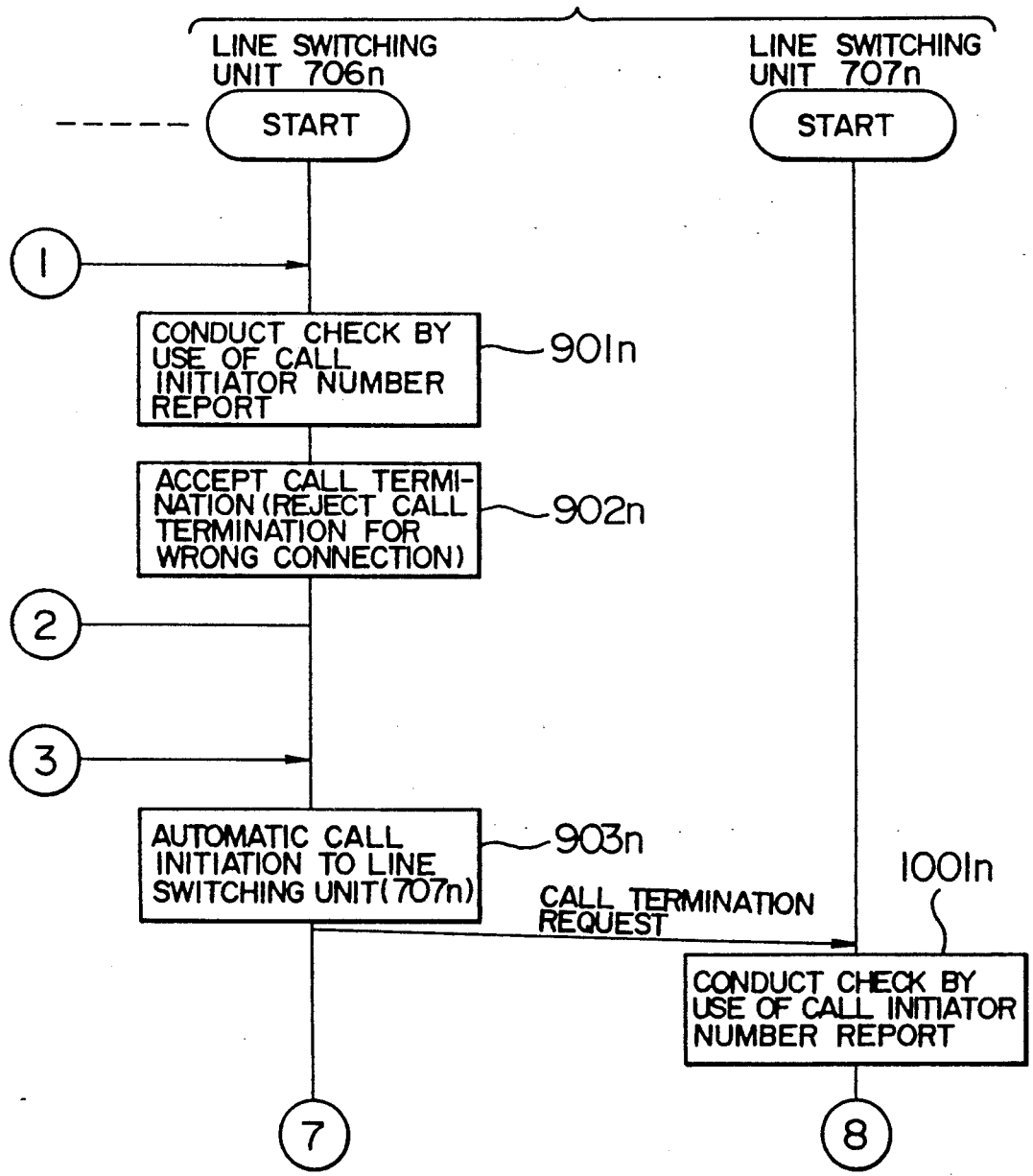
Figure 8C:
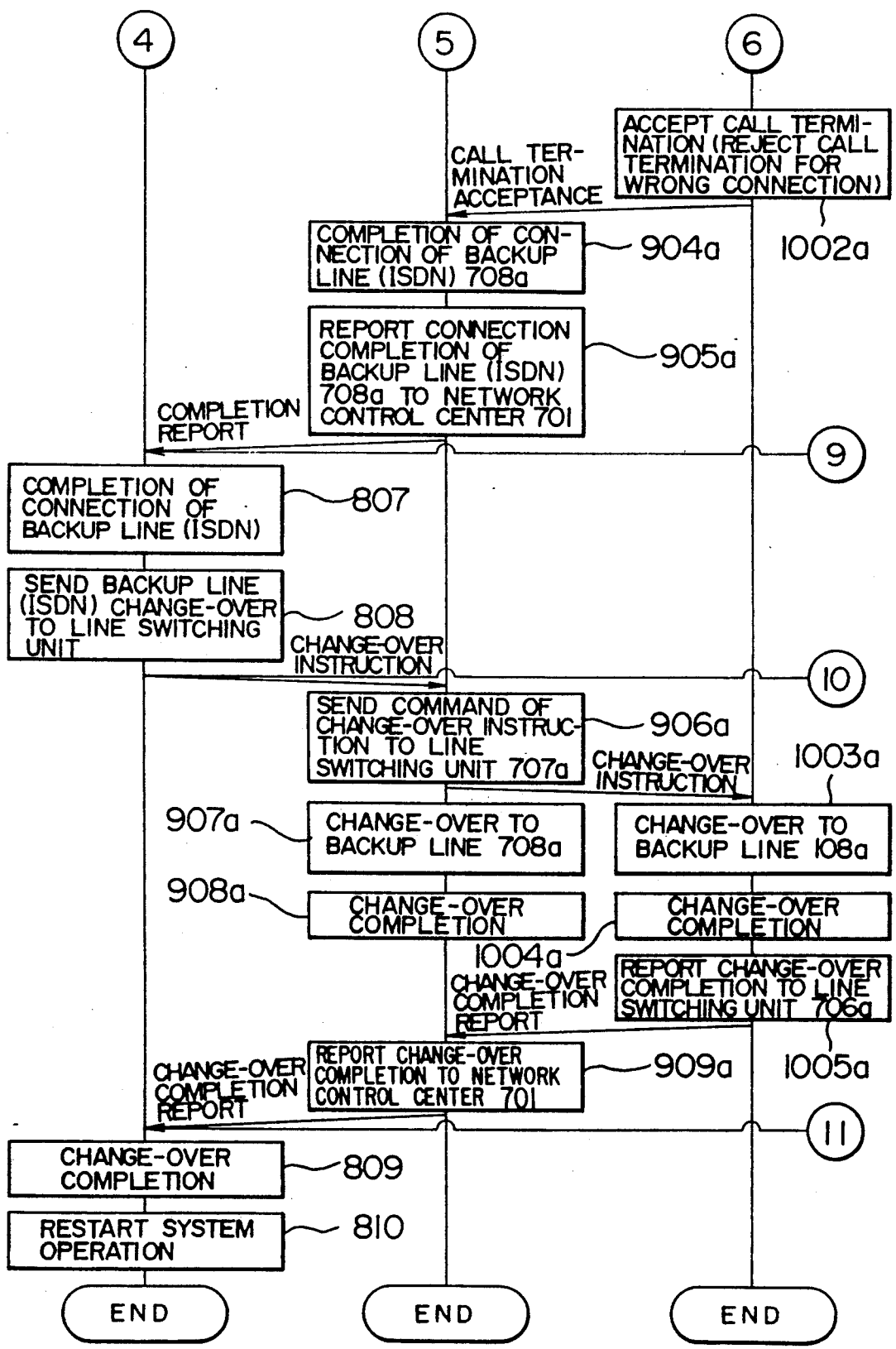

The line switching unit 102 receives a call termination request from the network control center 101. In order to prevent a wrong connection, a call initiator number notification or report is adopted in the line switching unit 102. Namely, the control section 102b checks whether or not the table 111 of the line switching unit 102 contains the call initiator number of the network control unit 109 of the network control center 101 (step 301). If this is the case, the call termination is accepted and then a command indicating a call termination acceptance and the like is sent to the network control center 101 (step 302); otherwise, the call termination is rejected and hence the line is disconnected (steps 320 to 323 of FIG. 5). FIG. 5 shows the processing flow of the line switching unit 102 at an occurrence of a wrong connection. In this embodiment, the call initiator number notification is employed to prevent the wrong connection; however, a subaddress, information between users, or the like may also be used for this purpose.

When the network control center 101 receives the command indicating a call termination acceptance and the like from the line switching unit 102, the connection completion is assumed (step 205). Next, an instruction and the like associated with a connection of the backup communication line is sent to the line switching unit 102 (step 206). On receiving the instruction of the backup line connection from the network control center 101, the line switching unit 102 automatically issues a call via the backup line 108 to the line switching unit 103 (step 303). That is, the control section 102b of the line switching unit 102 obtains the number of the line switching unit 103 from the switching unit call initiation number field of the table 111 so as to issue a call via the connecting section 102d to the line switching unit 103 by use of the ISDN as the backup line 108. The control section 102b of the line switching unit 102 may transfer a password obtained from the password field of the table 111.

On receiving the call termination request from the line switching unit 102, the line switching unit 103 causes the control section 103b to determine, by use of the call initiator number notification for prevention of the wrong connection, whether or not the pertinent call initiator number (the call initiator number of the line switching unit 102 in this case) is found in the table 112 of the line switching unit 103 (step 401). If a password has also been received, it is also checked with the password found in the table 112. As a result, if the call termination is acceptable, the call is received such that a command indicating a call termination acceptance and the like are sent to the line switching unit 102 (step 402); otherwise, the call termination is rejected and the line is hence disconnected (through the same processing as that of the steps 320 to 323 of FIG. 5).

On receiving the command indicating a call termination acceptance and the like from the line switching unit 103 (step 304), the control section 102b of the line switching unit 102 transmits a command indicating a connection completion of the backup line 108 and the like to the network control center 101 (step 305). The network control center 101 receives the command indicating a connection completion of the backup line 108 and the like, thereby completing the connection of the backup line 108 (step 207).

After the connection of the backup line 108 is completed, the network control center 101 issues a command indicating a switch instruction and the like to the line switching units 102 and 103 (step 208). In this operation, the command and other information items are sent via the line switching unit 102 to the line switching unit 103. On receiving the command indicating a switch instruction of the backup line 108 and the like from the network control center 101, the control section 102b of the line switching unit 102 issues a command indicating a switch instruction to the line switching unit 103 via the backup line 108 thus connected (step 306). In addition, a switch instruction is sent to the line switching mechanism or section 102a so as to change over the connection of the node 104 to the backup line 108 (step 307).

On receiving the command indicating a switch instruction of the backup line 108 from the network control center 101 via the line switching unit 102, the line switching unit 103 accomplishes a line switching operation (step 403). After the change-over operation (step 404) is completed, a command designating a change-over completion report (405) and other information are transmitted to the network control center 101. After the change-over is completed (step 308), when the command designating a change-over completion report is received, the line switching unit 102 sends a change-over completion report to the network control center 101 (step 309). When the network control center 101 receives the command designating a change-over completion report of the line switching units 102 and 103, the change-over operation is completed (step 209).

In this embodiment, the call initiation is achieved from the network control center 101 to the line switching unit 102 such that the line switching unit 102 causes the line switching unit 103 to achieve the change-over operation to the backup line 108; however, the change-over operation may be arbitrarily conducted, and hence the operation may also be carried out in the reverse fashion.

In the case where the DDX-C or a subscriber telephone line is used, like in the case of the ISDN, a measure to prevent the wrong connection is required, namely, when connections are completely established between the network control center and the respective line switching units, a command similar to a password is employed to check the validity of connection between the respective units. In addition, in the case of the DDX-C, a closed user group service may be adopted as the measure to prevent the wrong connection. Furthermore, since the respective line switching units are connected to each other, the registration and update of a connection number and the like (in the tables 111 and 112 of the respective line switching units 102 and 103) may also be implemented in a centralized manner from the network control unit 109.

Referring here to the flowchart of FIG. 6, a description will be given of a processing procedure in the case where the contents of the tables 111 and 112 are to be updated.

First, in the network control center 101, in order to determine the workers or maintenance engineers allowed to achieve the table registration and update of the respective line switching units, it is required to input a user identification code and a password thereof. If the registration and update are allowed, the system accepts the associated operations; otherwise, such operations are rejected (step 501). To establish connection between the network control center and line switching units, a call initiation is effected to the line switching units (step 502). On receiving a call termination request from the network control center, the line switching unit conducts a check, by use of a call initiator number report as a countermeasure for prevention of the wrong connection, to determine whether or not the table of the line switching unit contains the call initiator number (the call initiator number of the network control unit 109 of the network control center 101 in this case) (step 601). If this is the case, the call termination is accepted and then a command indicating a call termination acceptance and the like is sent to the network control center (step 602); otherwise, the call termination is rejected and the line is hence disconnected (through the same processing as that of the steps 320 to 323 of FIG. 5). When the command of the call termination acceptance is received from the line switching unit, the line connection is completed (step 503).

Next, the network control center transmits a command denoting a table registration and update instruction or the like to the line switching unit (step 504). The line switching unit receives the table registration and update instruction (step 603). On receiving a command indicating the acceptance of the table registration and update from the line switching unit, the network control center transmits data to update the table (step 505). The line switching unit receives data of the table registration and update from the network control center and then updates items such as a connection number in the table (step 604). When the update is completed, a command of the completion report or the like is transmitted to the network control center (step 605). The network control center receives the command notifying the table registration and update completion from the line switching unit, thereby completing the table registration and update (step 506).

In the embodiment above, the table of the line switching unit holds the call initiation number of the partner line switching unit; however, for each switching operation, a number instructed from the network control center may be used for a call initiation.

In the case where a plurality of lines are to be switched at the same time, the network control unit of the network control center conducts a broadcast communication. FIG. 7 shows an embodiment associated with this operation. The system of FIG. 7 includes a plurality of networks. Namely, in regions or areas B, C, D, and E; there are respectively installed nodes 704a, 705a, 704n, and 705n; line switching units 704a, 707a, 704n, and 707n; and tables 711a, 712a, 711n, and 712n. The configuration further includes a network control center 701 in which a network control unit 702 is installed so as to be connected via a communication line 703 to the line switching units 706a and 706n of the areas B and D, respectively. The line switching unit 706a of the area B is connected via a communication line 709a and a backup line 708a to the line switching unit 707a of the area C; whereas the line switching unit 706n of the area D is connected via a communication line 709n and a backup line 708n to the line switching unit 707n of the area E. The backup lines 708a and 708n and the communication line 703 are implemented, for example, by use of the ISDN. The line switching units 706a, 706n, 707a, and 707n are configured in a similar fashion as those employed in the system of FIG. 2.

Referring to FIGS. 8A to 8D, a description will be given of a change-over operation in an occurrence of a line failure like in the case of the embodiment of FIG. 7. In FIGS. 8A to 8D, the processing steps are to be continued as indicated by numerals in circles. A processing of these flowcharts is substantially identical to that of FIGS. 4A to 4C. First, when the operator finds an occurrence of failures in a plurality of communication lines 709 (steps 801 and 802), it is required to input a user ID and a password thereof for determination of operators or maintenance engineers to conduct the line switching operation. In step 803, the system allows the operation, the operator achieves the line switching operation; otherwise, the operation is rejected. When the operation is allowed, the network control center simultaneously initiates a call (conducts the broadcast communication) to the line switching units 706a to 706n (step 804). In response thereto, the line switching units 706a to 706n carry out a check by use of the call initiator number. If the number indicates that the call termination is acceptable, the call termination is accomplished and then a command designating a call termination acceptance or the like is sent to the network control center 701 (steps 901a, 902a, 901n, and 902n). When the network control center 701 receives the command indicating the call termination acceptance from each of the line switching units 706a to 706n, the line connection is completed (step 805). Subsequently, a command to connect the backup lines 708 is transmitted to the pertinent line switching units 706 (step 806). The line switching units 706a to 706n respectively conduct automatic call initiations to the line switching units 707a to 707n by use of call initiation numbers registered in data tables 711a and 711n, respectively (steps 903a and 903n). The line switching units 707a and 707n respectively achieve a check based on the call initiator number. If the number is acceptable, the call termination is achieved and a command indicating the call termination acceptance or the like is sent to the line switching units 706a to 706n (steps 1001a, 1002a, 1001n, and 1002n). On receiving the command of the call termination acceptance from units 707a to 707n, the line switching units 706a to 706n respectively send a command denoting a completion report of the backup line connection or the like to the network control center 701 (steps 904a, 905a, 904n, and 905n). When the network control center 701 receives the command denoting the completion report, the connection to the backup lines 708 is completed (step 807). After the backup lines 708 are thus connected, a command indicating a switch indication or the like is sent to the line switching units 706a to 706n (step 808). On receiving the command of the switch instruction of a change-over to the backup lines from the network control center 701, the line switching units 706a to 706n respectively transmit a command designating a switch instruction to the line switching units 707a to 707n, respectively. At the same time, the line switching units 706a and 706n respectively conduct a line switching operation (step 906a, 907a, 906n, and 907n). When the commands of the switch instruction to the backup line are received from the network control center 701 respectively via the line switching units 706a to 706n, the line switching units 707a to 707n conduct the respective switching operations (steps 1003a and 1003n). When the switching operations are completed (steps 1004a and 1004n), these switching units 707a to 707n respectively send a command denoting a switch completion report to the network control center 701 (steps 1005a and 1005n). After the line switching operations are completed, the line switching units 706a to 706n send, on receiving the command of the change-over completion report from each of the line switching units 706a to 707n, a change-over completion report to the network control center 701 (steps 909a and 909n). When the network control center 701 receives the commands of the change-over completion report from the line switching units 706a to 706n, the line switching is completed (step 809) and then the system operation is resumed (step 810).

FIG. 9 shows an operation screen of the network control unit 702. As shown here, the operation screen displays a failed line code name, a backup line code name, line ends indicated in a format of END~END, a line switching unit call termination number, success or failure of call termination at line switching unit (Y/N), and success or failure respectively of connection and switching of backup line (Y/N). A password is employed for a user check in the step 203 of FIG. 4A and in the step 803 of FIG. 8A. The content of the password is not displayed for security purposes and the password is displayed as "XXXX" on the screen.

Figure 10:
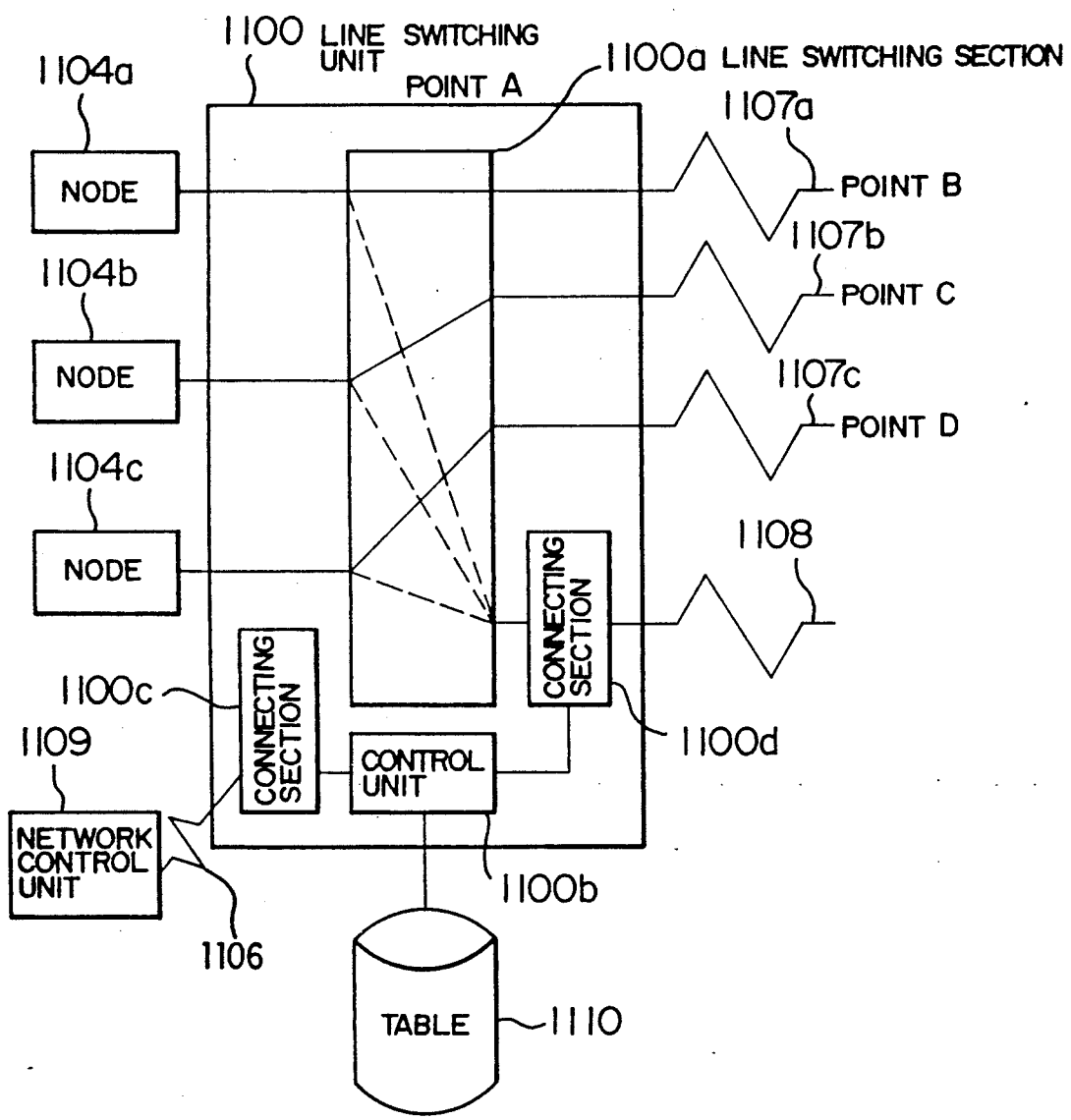
FIG. 10 is a schematic diagram showing an alternative embodiment of the network system according to the present invention.

FIG. 10 shows an alternative embodiment the network system according to the present invention. In the example of this figure, a plurality of nodes 1104a, 1104b, and 1104c are connected to a line switching unit 1100 located at point A so as to be respectively linked to other points B to D via the current communication lines 1107a, 1107b, and 1107c, respectively. At a failure of one of the current communication lines, the line switching unit 1100 including a line switching section 1100a operates under control of a controller 1100b to change over nodes connected to the failed line to backup line 1108. The system includes a network control center in which a network control unit 1109 is installed so as to be linked to a connecting section 1100c via a line 1106, which is implemented, for example, by the ISDN. The configuration also includes a connecting or interface section 1100d and a table 1110 similar to the table 111 described above.

The line switching or change-over control can be achieved substantially in the same manner as described in conjunction with FIGS. 4A to 4C. However, in the switching operation, the network control unit 1109 instructs the line switching unit 1100 that one of the current lines is to be replaced by the backup line 1108. The control unit 1100b obtains a call initiation number of either one of the points B, C, and D depending on the failed line so as to achieve a connection control of the backup line 1108.

In addition, in the constitution of the embodiment above, the network control unit 1109 and the line switching unit 1100 are to be linked to each other only when the line switching operation is conducted; however, the system may be configured such that these constituent units 1109 and 1100 are kept connected to each other.

Furthermore, in the embodiment above, the network control unit 1109 issues a call for a line switch instruction to one of the interconnected line be supplied to both line switching units.

As described above, according to the present invention, the line switching instruction may be issued from the network control center to the respective line switching units at a particular time and hence the change-over to the backup lines may be controlled from a remote location in a centralized manner. Moreover, in the case where a leased or public line is used as the communication line, a security function is added to check authorization of a line connection, which thus prevents a wrong connection. Furthermore, the system down time and system maintenance operators required for the line switching operation can be considerably reduced and hence the number of operation steps is minimized.

While particular embodiments of the invention have been shown and described, it will be obvious to those skilled in the art that various changes and modifications may be made without departing from the present invention in its broader aspects.

What is claimed is:

1. A network system having a plurality of nodes and a line switching function comprising:

a plurality of line switching units interconnectable by means of a communication line and a backup communication line, each of said plurality of line switching units being connected to one of said plurality of nodes such that nodes are connected to each other via said line switching units and either of said communication line and said backup communication line; and a network control unit connected to a first of said pair of line switching units and sending a line switching instruction subsequent to a call to said first line switching unit;

said first line switching unit comprising:

a first storage device storing a call initiator number of said network control unit; and a controller checking during a connection sequence whether or not a call initiator number of said call from said network control unit is consistent with the call initiator number stored in the first storage device, accepting the line switching instruction when the call initiator number of said call is consistent with the call initiator number stored in said first storage device, sending the line switching instruction subsequent to a call to a second of said plurality of line switching units and switching between said communication line and said backup communication line; and said second line switching unit comprising:

a second storage device for storing a call initiator number of said first line switching unit; and a second controller checking during a connection sequence whether or not a call initiator number of said call from said first line switching unit is consistent with the call initiator number of said first line switching unit stored in the second storage device, accepting the line switching instruction when the call initiator number of said call from said first line switching unit is consistent with the call initiator number stored in said second storage device, and switching between said communication line and said backup communication line.

2. A network system having a plurality of nodes and a line switching function comprising:

a pair of line switching units interconnectable by means of a communication line and a backup communication line, each of said line switching units being connected to one of said plurality of nodes such that nodes are connected to each other via said line switching units and either of said communication line and said backup communication line; and a network control unit connected to a first of said pair of line switching units for sending a line switching instruction subsequent to a call to said line switching unit;

said first line switching unit comprising;

a first storage device storing a call initiator number of said network control unit; and a first controller checking during a connection sequence whether or not a call initiator number of said call from said network control unit is consistent with the call initiator number stored in the first storage device, accepting the line switching instruction when the call initiator number of said call is consistent with the call initiator number stored in said first storage device, and sending a call to a second of said pair of line switching units for switching between said communication line and said backup communication line;

said second line switching unit comprising:

a second storage device storing a call initiator number of said first line switching unit; and a second controller checking during a connection sequence whether or not a call initiator number of said call from said first line switching unit is consistent with the call initiator number of said first line switching unit stored in the second storage means and switching between said communication line and said backup communication line when the call initiator number of said call from said first line switching unit is consistent with the call initiator number stored in the second storage device.

3. A network system according to claim 1, wherein said backup communication line and a connection between said network control unit and said first line switching unit are included in a switching network.

4. A network system according to claim 3, wherein said switching network is an integrated service digital network (ISDN).

5. A network system according to claim 2, wherein said backup communication line and a connection between said network control unit and said first line switching unit are included in a switching network.

6. A network system according to claim 5, wherein said switching network is an integrated service digital network (ISDN).

7. A network system according to claim 1, wherein the network control unit is connected to the second line switching unit.

8. A network system according to claim 2, wherein the network control unit is connected to the second line switching unit.

* * * * *

UNITED STATES PATENT AND TRADEMARK OFFICE
CERTIFICATE OF CORRECTION

PATENT NO. : 5,193,086
DATED : March 9, 1993
INVENTOR(S) : Shigeki Satomi, et al It is certified that error appears in the above-indentified patent and that said Letters Patent is hereby corrected as shown below:

| Column | Line | |
|---|---|---|
| 1 | 15 | Change "of" to --in--. |
| 2 | 13 | Before "DESCRIPTION" insert --BRIEF--; after "DRAWINGS" delete "BRIEF". |
| 3 | 31 | Change "unit 102,)" to --unit 102), |
| 3 | 51 | Change "switch" to --switching--. |
| 3 | 52 | Change "step 201)." to --step 203).--. |
| 7 | 21 | Change "711a and 711n" to --711a to 711n--. |
| 7 | 22 | Change "707a and 707" to --707a to 707n--. |
| 7 | 45 | Change "706a and 706n" to --706a to 706n--. |
| 8 | 48 | After "line" insert --switching units; however, the switch instruction may--. |

Signed and Sealed this

Eighteenth Day of January, 1994

Attest:

BRUCE LEHMAN

Attesting Officer     Commissioner of Patents and Trademarks